United States Patent [19]

Morris

[11] 4,396,290
[45] Aug. 2, 1983

[54] TWO PUMP-FREQUENCY-STIMULATED BRILLOUIN SCATTERING RING LASER GYROSCOPE

[75] Inventor: Glen J. Morris, Salt Lake City, Utah

[73] Assignee: University of Utah Research Institute, Salt Lake City, Utah

[21] Appl. No.: 78,258

[22] Filed: Sep. 24, 1979

[51] Int. Cl.³ ............................................ G01C 19/64
[52] U.S. Cl. ................................................. 356/350
[58] Field of Search ............................... 356/350, 351

[56] References Cited

U.S. PATENT DOCUMENTS

| | | | |
|---|---|---|---|
| 3,484,169 | 12/1969 | Skalski et al. | 356/350 |
| 4,159,178 | 6/1979 | Vali et al. | 356/350 |
| 4,208,128 | 6/1980 | Thompson et al. | 356/350 |

*Primary Examiner*—Vincent P. McGraw
*Attorney, Agent, or Firm*—J. Winslow Young; H. Ross Workman; Rick D. Nydegger

[57] ABSTRACT

An improved ring laser gyroscope is disclosed that uses two counterrotating beams separated in frequency by an amount that is large compared to lock-in thresholds. The two beams are heterodyned together to obtain a beat frequency whose magnitude is proportional to rotation rate. In the preferred embodiment, the gyroscope utilizes an optical fiber waveguide as the laser cavity. The two countercirculating beams are generated via the mechanism of stimulated Brillouin scattering within the cavity. The two Brillouin ring lasers are pumped by two beams derived from an external pump laser. The derived beams are shifted in frequency by acousto-optic modulators. Lock-in is eliminated at all rotation rates. Other error sources common to ring laser gyroscopes are eliminated or greatly reduced.

1 Claim, 4 Drawing Figures

TWO PUMP-FREQUENCY-STIMULATED BRILLOUIN SCATTERING RING LASER GYROSCOPE

ACKNOWLEDGEMENT

This invention was produced with the support of the Office of Naval Research (Contract Number N00014-76-C-0831) and the National Science Foundation.

BACKGROUND

1. Field of the Invention

This invention is a new and novel ring laser gyroscope. It utilizes stimulated Brillouin scattering (SBS) in an optical fiber waveguide to produce two independent, counterrotating laser beams that are heterodyned together to sense rotation. The common cavity for these two laser beams is the optical fiber waveguide that is wound on a form to enclose an area, A. When the two beams are heterodyned together a beat frequency is obtained that is directly proportional to the enclosed area, A, and to the rotation rate, $\Omega$. The acousto-optical effect called stimulated Brillouin scattering is used to produce the two ring lasers operating respectively in the clockwise and counterclockwise directions around the optical fiber cavity. Each Brillouin ring laser (BRL) is pumped by a pump laser beam derived from an external pump laser. An important, novel, and central feature of this invention is that the two pump beams are operated at different frequencies. Difficulties inherent in other laser gyroscopes are negated by this technique, and a simpler, more versatile, more accurate system for rotation rate readout is achieved.

2. The Prior Art

Conventional ring laser gyroscopes utilize optical oscillators (lasers) to produce rotation sensors that can be made into rate integrating gyroscopes. In practice a ring laser consists of a gain section and two or more passive sections. The ring is optically closed on itself by means of mirrors, and the closed ring containing the gain section constitutes the laser cavity. Two coherent laser oscillations are established within the cavity, one in the clockwise (CW) and one in the counterclockwise (CCW) direction around the closed ring. A portion of each circulating beam is split off by a beam splitter and these two split off beams are recombined and heterodyned together to produce a beat frequency. The beat frequency is directly proportional to the area enclosed by the ring and to the rotation rate about any axis perpendicular to the plane of the ring. The beat frequency can be expressed mathematically by the equation:

$$\Delta f = \frac{4A\Omega}{\lambda L} \tag{1}$$

In Equation 1, $\Delta f$ is the beat frequency in Hertz (Hz), A is the are enclosed by the ring in square meters (m$^2$), $\Omega$ is the rotation rate about any axis perpendicular to the plane of the ring in radians per second (rad/sec), $\lambda$ is the wavelength of the laser radiation in meters (m), and L is the cavity length in meters measured along the beam path (the same for both beams).

All optical rotation sensors can be explained theoretically in terms of the Sagnac effect. Sagnac showed in 1913 that it is possible to detect rotation optically. In his instrument (a ring interferometer), and area, A=866 cm$^2$, was circumscribed by oppositely traveling beams of light. The two beams were combined to form an interference pattern. A rotation of the device produced a fringe shift. The fringe shift was directly proportional to the rotation rate.

Subsequent analyses based on both relativistic and non-relativistic arguments led to the same conclusion; namely, that the transit time around the ring for light traveling in the direction of rotation is different from that for light traveling opposite to the direction of rotation. The time difference is given by $$\Delta t = \frac{4A\Omega}{c^2}, \tag{2}$$

and the corresponding effective path length difference is given by $$\Delta L = \frac{4A\Omega}{c}. \tag{3}$$

In Equations 2 and 3, $\Delta t$ and $\Delta L$ are the effective transit time and length differences, respectively, and c is the free space seed of light. A is the area enclosed by the ring and $\Omega$ is the rotation rate, both as in Equation 1.

The salient features of the Sagnac effect have been shown to be:

(a) Equations 2 and 3 are correct.

(b) The results are independent of the shape of the area, A.

(c) The results do not depend on the location of the axis of rotation.

(d) The results do not depend on the presence of a co-moving refracting medium in the beam path.

It is important to note that a measurement of the optical path length difference (Equation 3) enables an observer located on a rotating frame of reference to measure the absolute rotation of his frame in inertial space.

The basic requirement for coherent laser oscillation within a closed ring laser cavity is that the cavity length L, and the laser wavelength, $\lambda$ as measured in the cavity must satisfy the relationship $$L = m\lambda \tag{4}$$

where m is an integer. Equivalently, the laser oscillation frequency corresponding to this wavelength is $$f = mc/L \tag{5}$$

where f is the laser oscillation frequency and the other terms are as previously defined. Typically, m is a large number in the range from 10$^5$ to 10$^7$; or larger, if the cavity is a long optical fiber.

Equations 4 and 5 do not imply that oscillation is impossible unless some very stringent condition is met relative to cavity length and laser wavelength. What is implied is that the laser oscillation frequency will adjust to a value where the equations are satisfied for some integer value of m. It is assumed, of course, that system gain and gain-bandwidth are adequate to permit oscillation. Simple manipulation of Equations 4 and 5 leads to the result $$\frac{\Delta L}{L} = \frac{\Delta \lambda}{\lambda} = -\frac{\Delta f}{f} \tag{6}$$

where the minus sign indicates a decrease in frequency for an increase in L. Combination of the first and last terms of Equation 6 with Equation 3 leads immediately to the result $$\Delta f = \frac{4A\Omega}{\lambda L} \tag{7}$$

This is identical to Equation 1 and is the basic laser gyroscope equation relating beat frequency, area, rotation rate, wavelength, and cavity length.

Reduction to practice of the theoretical possibilities embodied in Equation 7 has proceeded along two general lines. The first approach employs a gaseous helium-neon laser gain section and, typically, two passive sections. The three sections are arranged in an equilateral triangle configuration. Mirrors at the triangle vertices close the ring. Two counterrotating laser oscillations are maintained in the ring and operation is basically as predicted by Equation 7. This device was disclosed in U.S. Pat. No. 3,484,169. However, there are undesirable effects operating in any such device. These effects can be classified as null shift, lock-in, and mode pulling.

Null shift errors are present whenever the cavity is anisotropic with respect to the CW and CCW laser beams, that is, when the effective cavity length is different for the two directions. In that case the oscillation frequencies are different for the two beams even when the rotation rate is zero. This beat frequency in the absence of rotation (null shift) can be a very significant source of error. In deriving Equation 7, the geometrical cavity length, L, was used. In an exact analysis the optical path length is required, which is the integral of refractive index over the path length. Any effect that causes the refractive index along the path to be different for the CW and CCW directions will introduce a null shift. One such effect is the Fresnel-Fizeau drag effect. It has been shown that the velocity of light, $v$, in a moving medium whose index of refraction is n and whose velocity is V is given by $$v = \frac{c}{n} \pm V\left(1 - \frac{1}{n^2}\right) \tag{8}$$

where the plus and minus signs correspond, respectively, to light traveling in and against the direction of the motion. In Equation 8 the velocity of light in the medium, $v$, has changed from its nominal value of c/n and an anisotropy has been introduced relative to the two directions of travel.

The electric discharge in the gaseous gain section of a ring laser imparts an organized flow velocity to the electrons and positive ions in the discharge plasma. In addition, a net flow of neutral gas atoms is also induced (cataphoresis). Each of these flows contributes to the Fresnel drag effect discussed above and, therefore, to a null shift. Also, any air flow within the passive sections of the cavity would contribute to a null shift. Such effects can produce beat frequencies orders of magnitude larger than those due to typical rotational inputs. There are other lesser sources of null shift such as magnetic fields and nonreciprocal saturation effects in the gain medium.

Lock-in is a well known phenomenon common to all coupled oscillator systems. The bidirectional ring laser is such a coupled system. There is mutual coupling between the counterrotating oscillations. Consequently, at low rotation rates where the oscillations are at very nearly the same frequency, they lock together. Thus, a dead band is produced wherein the system is not responsive to rotation. The dominant source of coupling between the two oscillations is the mutual scattering of energy from each beam into the direction of the other. This is mainly due to scattering from the mirror surfaces. Even with optimum design the lock-in phenomenon is invariably present in ring laser gyros with gaseous gain sections.

Mode pulling is the third major source of error in a conventional ring laser gyroscope. In the derivation of Equation 7, the optical gyroscope equation, an ideal, empty cavity was assumed. However, the actual active gain section contains the lasing medium that is the source of the laser radiation. Any such medium is dispersive, that is, its refractive index varies with frequency. Dispersion is classified as normal in frequency regions where the refractive index varies slowly and smoothly with frequency. However, in regions near a resonance (gain maximum) the index undergoes a rapid change and there is absorption. This is referred to as anomalous dispersion. Because of anomalous dispersion effects, an oscillating mode will change in frequency from the value predicted by empty resonator theory (mode pulling). Alternatively, two modes oscillating with nearly equal frequencies can pull closer together, the extreme case being lock-in. The frequency shift caused by mode pulling causes a change in the gyro scale factor and leads to an error in rotation rate readout.

All of the difficulties detailed above with respect to conventional ring laser gyros have been resolved to some degree of satisfaction. Techniques have been developed to defeat or compensate the major error sources. For example, proper design of the laser will guarantee single mode operation and eliminate low frequency noise caused by mode coupling. Operating at low gain minimizes mode pulling and leads to a reasonably stable scale factor. Static null shifts are minimized by keeping non-reciprocal elements out of the optical path. Two balanced DC discharges are used to cancel null shifts due to Langmuir flow effects. The entire cavity is sealed to prevent null shifts due to air flow in the beam path. Lock-in thresholds are minimized by careful mirror design.

Although lock-in cannot be completely eliminated, the problem can be made tractable through deliberate imposition of a known null shift bias. This bias provides a beat frequency in the absence of rotation that is known and that can be subtracted from an apparent rotation readout to obtain the true rotation rate. Null shift biases have been generated by several means. Included are discharge gas flow, Langmuir flow, Faraday effect, and mechanical motion of the gyro. The preferred method is alternating mechanical motion (dithering).

Useful discussions of basic theories involved in the conventional laser gyro can be found in IEEE SPECTRUM, "The Laser Gyro" by Joseph Killpatrick, October 1967, pages 44–45; and in the book *Laser Applications*, edited by Monte Ross, Academic Press, New York, 1971, "The Laser Gyro" by Frederick Aronowitz, pages 133–200.

A second approach to ring laser gyroscope design is to use a solid laser gain section such as neodymium-yttrium-aluminum garnet (Nd:YAG) or ruby. Unfortunately, all solid lasers such as Nd:YAG or ruby exhibit homogenous line broadening. It is not possible to maintain two oppositely directed, nearly equal frequency, independent oscillations in such a gain medium. The possibilities have been thoroughly investigated. However, it has not proved feasible to use solid laser technology in ring laser gyroscopes.

A third approach to ring laser gyroscopes uses optical fiber as the laser cavity and depends on stimulated Raman scattering or stimulated Brillouin scattering to produce the required ring lasers. Each of these processes depends on an external pump laser to excite and sustain the internal oscillations in the optical fiber ring. One such device was disclosed in U.S. Pat. No. 4,159,178. This device has not been reduced to practice and analysis indicates it may be very prone to lock-in with lock-in thresholds too high to be compensated by practical means.

In view of the foregoing discussion relative to conventional laser gyroscopes and solid and optical fiber gyroscopes disclosed to date, it is clear than an improved laser gyroscope would be highly desirable. In particular, any genuine improvement relative to the major sources of error in laser gyroscopes, namely, null shift, lock-in, and mode pulling would be of technological advantage and importance. The invention disclosed and claimed herein is a novel, new ring laser gyroscope that has advantages over all laser gyroscopes previously disclosed.

BRIEF SUMMARY AND OBJECTS OF THE INVENTION

The invention disclosed herein is a new ring laser gyroscope that uses a novel approach to elimination of the major error sources present in laser gyroscopes using a gaseous gain section with a closed cavity, or laser gyroscope utilizing an optical fiber cavity and external pump laser only. The invention employs acousto-optic modulators to achieve two different-frequency, independent, coherent, countercirculating laser beams in a closed ring cavity. In the present implementation the ring cavity is a single mode optical fiber. The acousto-optic effect called stimulated Brillouin scattering is used to produce the countercirculating beams. These are excited and sustained by an external pump laser whose output beam is split into two equal intensity beams. Each beam is then transmitted through its own acousto-optic modulator that shifts the frequency of the beam by a set amount as determined by a crystal-controlled oscillator. The two frequency-shifted beams are then used to excite the countercirculating Brillouin ring laser beams in the optical fiber. The Brillouin ring laser beams are heterodyned together to sense rotation of the device, as in the conventional laser gyroscopes.

In a conventional ring laser gyro, two countercirculating laser beams are generated within a common gain section. Some scattering of each beam into the direction of the other is inevitable. This results in lock-in when the two countercirculating beams have very nearly the same frequency, that is, when the rotation rate is small. All conventional ring laser gyroscopes produced to date suffer from this problem. Ring laser gyroscopes utilizing optical fiber cavities with an external pump laser also suffer from this problem. In the present case, two distinct, coherent beams are generated with sufficiently different frequencies that lock-in is impossible even at zero rotation rate. Scattering from one beam into the direction of the other causes no effect. Thus, the lock-in problem is negated.

A second major source of error in conventional laser gyroscopes is null shift caused by anisotropies relative to the CW and CCW circulating beams. These directional differences in optical path length can be caused by gas flow, magnetic fields, and non-reciprocal saturation effects in the gain medium. In the present case the optical fiber cavity is identical for both CW and CCW beams. The only source of null shift would be misalignment of the two beams in any path outside the optical fiber cavity. This is easily corrected through proper alignment. Use of integrated optics techniques would prevent the problem altogether. Note that anisotropies due to gas flow or magnetic fields are non-existent here. Gas flow in conventional laser gyroscopes is a serious error source and its negation is of importance.

The third major source of error in laser gyroscopes is mode pulling, principally because of its effect on gyroscope scale factor. In a ring laser employing a gaseous gain section anomalous dispersion in the neighborhood of resonances (where the laser operates) causes oscillating modes to be displaced in frequency from their ideal, empty cavity values. The amount of displacement varies with gain, and this mode pulling gives rise to a change in the gyroscope scale factor, that is, in the magnitude of the beat frequency due to rotation. This is a potentially serious source of error. In the present case, anaomalous dispersion is not present and mode pulling does not exist. Consequently, mode pulling is negated as a source of error.

It is a primary object of this invention to provide improvements in ring laser gyroscopes, as discussed above, in particular, elimination or reduction of error sources is a major objective.

Another object of the invention is the two-frequency beam system that eliminates lock-in at any and all rotation rates. This technique is advantageous relative to rotation rate readout as well.

These and other objects and features of the present invention will become more fully apparent from the following description and appended claims taken in conjunction with the accompanying drawings.

DETAILED DESCRIPTION OF THE PREFERRED EMBODIMENTS

Figure 1:
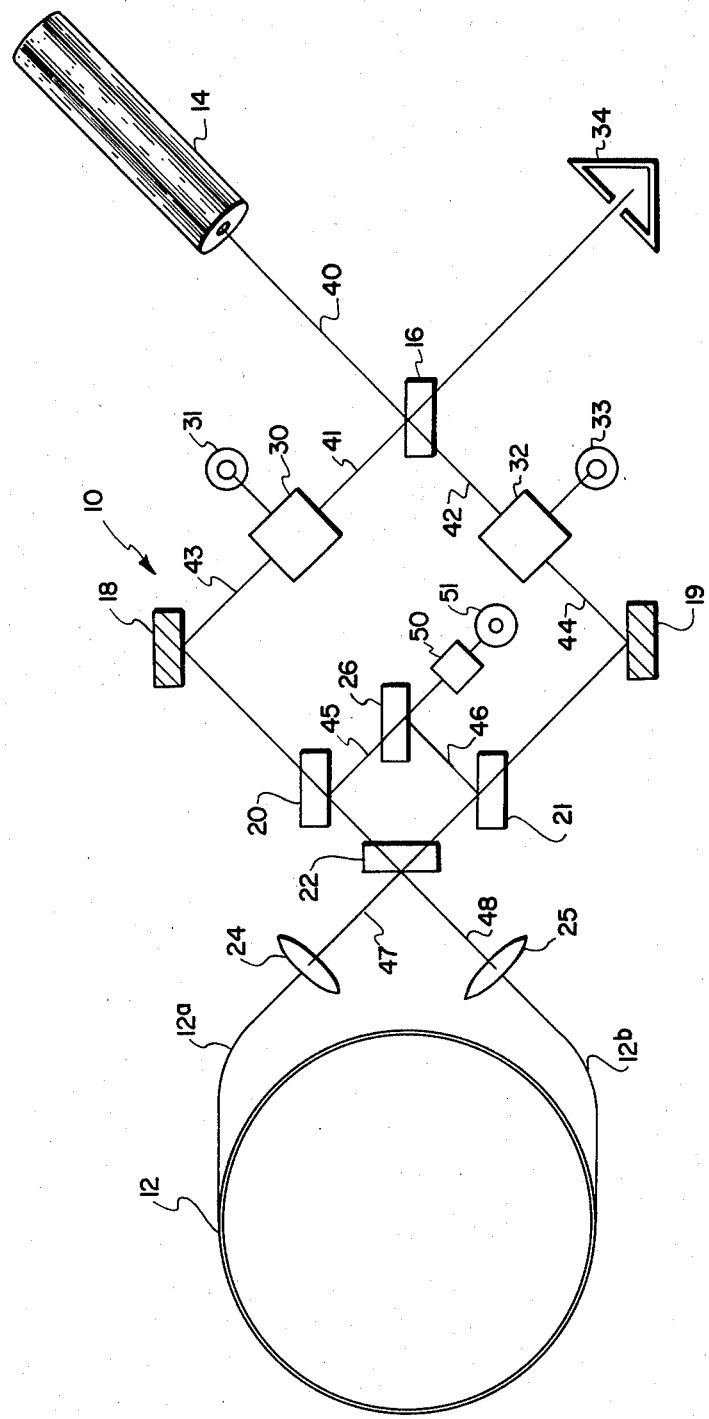
FIG. 1 is a schematic illustration of the two-pump frequency, Brillouin ring laser gyroscope system of this invention.

The invention is best understood by reference to the Figures wherein like parts are designated with like numerals throughout.

General Discussion

Many of the difficulties encountered in ring laser gyroscopes can be eliminated or reduced by means of the two-frequency technique discussed above. However, implementation of the technique requires the capability to have access to the two counterrotating laser beams. In a conventional laser gyroscope where the oscillations are generated internally by laser action, the two-frequency method is not feasible because both beams would be affected equally and the lock-in problem would persist. However, possibilities exist with respect to several other systems. One such system, and the presently preferred embodiment for the two-frequency system, is to use an optical fiber as the laser cavity, and to pump the cavity with an external pump laser. Optical fiber lasers are now well-known and are of two types. These are the stimulated Raman scattering type and the stimulated Brillouin scattering type.

Optical fiber lasers utilizing stimulated Raman scattering have been reported by several authors. Argonion or Nd:YAG pump lasers are typical. In principle, laser oscillations could be excited in both directions around an optical fiber cavity using stimulated Raman scattering. Unfortunately, such a two-way ring laser would not be suitable for use in a laser gyroscope. The Raman oscillator frequencies bear no direct relationship to the pump laser frequency. Consequently, splitting the pump laser beam into two beams and frequency shifting the resulting beams with acousto-optic modulators would gain nothing since the Raman oscillator frequencies would be unaffected. Thus, the two-frequency technique would not be applicable. Also, the two Raman laser oscillations could not be used directly as in a conventional laser gyroscope because homogenous line broadening would lock the oscillations together as in other solid-laser gain sections.

The second type of optical fiber laser, namely, that utilizing stimulated Brillouin scattering, is ideally suited to the present case, and is the presently preferred embodiment for the two-frequency invention disclosed herein. Optical fiber lasers based on stimulated Brillouin scattering have been reported by several authors and basic results have been verified in several laboratories. As with the stimulated Raman scattering lasers discussed above, an external pump laser is used to excite and sustain the Brillouin scattering within the fiber cavity.

The scattering phenomenon that bears his name was originally discussed by L. Brillouin in 1922 (Ann. Phys. 17, 88 (1922)). Essentially, the phenomenon is that of scattering of light waves by sound waves that are present in the medium through which the light wave is propogating. The phenomenon is observed in solids, liquids, and gases. The basic reason for the scattering is that sound waves are pressure waves. The spatially and temporarily periodic pressure waves cause periodic changes in the dielectric constant of the medium, and, therefore, in the index of refraction. Thus, the refractive index of the medium is spatially and temporarily modulated in a periodic fashion. By well-established laws of optics, changes in refractive index are invariably accompanied by scattering (simple reflection being a special case of scattering).

In the scattering of light waves by sound waves (photons scattered by phonons), conservation of energy and momentum is required, and these requirements, together with a self-consistent electric field requirement, give the characteristics of the scattered wave as a function of the scattering angle. In general, the scattered wave is shifted in frequency from the incident wave by the amount of the sound wave frequency. The intensity of the scattered wave typically is a small fraction of the incident wave. The scattered waves are incoherent because the sound waves causing the scattering are incoherent, being generated by thermal effects.

Stimulated Brillouin scattering of an intense laser beam involves coherent amplification of a hypersonic lattice vibration and of the scattered wave. For a compressional wave the coupling between the acoustic wave and the optical waves (incident and scattered) is characterized as electrostriction. The basic process was outlined in the previous two paragraphs. The electrostrictive pressure is given by $$p = \frac{E^2}{8\pi} \rho \frac{d\epsilon}{d\rho} \tag{9}$$

where p is the pressure, E is the electric field strength, $\rho$ is the material density, and $\epsilon$ is its dielectric constant. Equation 9 can also be written as $$p = \frac{E^2}{8\pi} B \frac{d\epsilon}{d\rho} \tag{10}$$

where B is the material bulk modules of elasticity and other terms are as previously defined.

Because the pressure depends on the square of the electric field strength, two waves at frequencies of $f_p$, the pump wave frequency, and $f_p - f_s$, the scattered wave frequency, can drive a pressure wave (sound wave) at the difference frequency, $f_s$. This is the phenomenon of beats whereby sum and difference frequencies are generated when a square low dependence exists. Conversely, a pressure wave of frequency $f_s$ couples to an electromagnetic wave through the varying induced dipole moment density $$m = \frac{E}{4\pi} \rho \frac{d\epsilon}{d\rho} . \tag{11}$$

From Equations 10 and 11, it follows that as the Brillouin scattered component increases in intensity, the pump beam and scattered beam interact to drive the sound waves. Conversely, the larger intensity sound waves cause greater scattering. The pump wave, the scattered wave and the sound wave become coherent, and the amplification process continues until an equilibrium condition is reached.

Single mode optical fibers with their small core diameters and long interaction lengths are ideal media for production of stimulated Brillouin scattering. For example, one watt of pump laser power coupled into a fiber with a core diameter of 2.4 micrometers would imply an average power density in the core of $2.2 \times 10^{11}$ watts per square meter. This high power density together with the long interaction lengths achievable in an optical fiber is more than adequate to produce stimulated Brillouin scattering in the fiber. Note that with an optical fiber, the only scattered component that is of importance is that scattered directly backward within the acceptance cone of the fiber. This component is downshifted in frequency by the sound wave frequency in the fiber, namely, 34.1 GigaHertz (GHz).

An optical-fiber-cavity Brillouin ring laser was reported by Hill, Kawasaki, and Johnson in 1976 (Appl. Phys. Letters 28, 608 (1976)). This BRL used an argon-ion pump laser and an optical fiber with a core diameter of 2.4 micrometers. The ring was closed on itself by means of beam splitters and coherent oscillations were obtained in one direction around the ring. The pump laser wavelength was 514.5 nanometers and the Brillouin ring laser line was downshifted from the pump frequency by 34.1 GHz, as expected.

Subsequently, it was shown that BRL oscillations could be produced in both the CW and CCW directions around an optical fiber ring simultaneously, as in a conventional ring laser utilizing a gaseous gain section. Potentially, these bidirectional oscillations could be heterodyned together to produce a beat frequency, as in the conventional ring laser gyroscope.

Attempts to observe a beat frequency with the two-way BRL system have not been successful because of lock-in between the two oscillations, as discussed previously. Lock-in is due to scattering of energy from each beam into the direction of the other. In the case of the two-way BRL utilizing an optical fiber cavity, reflections at the fiber ends, reflections and scattering off mirrors and beamsplitters, and, particularly, internal reflections and scattering within the optical fiber along its entire length all contribute to the lock-in problem.

The two-way Brillouin ring laser system described above is ideally suited to the two-frequency-beam invention disclosed herein. The optical fiber cavity is pumped in both directions (CW and CCW) by pump beams derived from a common pump laser. By frequency shifting these pump beams so that they are separated by a relatively large frequency compared to the lock-in threshold, and compared to the pump laser bandwidth, the two BRL beams are made to be totally independent of each other. Nevertheless, they retain their coherence relative to each other. They can then be heterodyned together to produce a beat frequency characteristic of the area enclosed by the ring and of the rotation rate of the ring, as in a conventional laser gyroscope.

Referring now to FIG. 1, the configuration of the two-frequency Brillouin ring laser gyroscope is shown generally at 10 and includes an optical fiber waveguide ring 12, a pump laser 14, photodiode 50, modulators 30 and 32, and various optical and electronic equipment, the discussion of which will be set forth more fully hereinafter.

A beam 40 from pump laser 14 is divided into two equal intensity beams, beams 41 and 42, by beam splitter 16. These beams pass through modulators 30 and 32 which shift their frequency by 90 MHz and 120 MHz, respectively, to become beams 43 and 44. The beams next reflect respectively off mirrors 18 and 19, and are then incident on beam splitter 22. The resulting beams, beams 47 and 48, are orthogonal at this point. They are incident on microscope objectives 24 and 25 which inject the beams into the ends 12a and 12b, respectively, of the optical fiber ring 12. Consider first the beam leaving microscope objective 24. This beam proceeds in a counterclockwise direction around fiber ring 12. Upon exiting the opposite fiber end 12b this beam is incident on microscope objective 25, passing to beam splitter 22 which transmits 50 percent and reflects 50 percent to microscope objective 24 and from there back into the fiber ring 12. Thus, a CCW circulating pump beam is established in fiber ring 12. Similarly, a CW circulating pump beam is also established in fiber ring 12 utilizing the beam 48 and the microscope objective 25.

The CCW circulating pump beam is scattered by sound waves present in the fiber because of thermal or other excitation. Most of the scattered component is lost, the exception being that component that is scattered directly backward within the acceptance cone of the fiber. This component SBS is downshifted in frequency from its pump beam by the sound wave frequency in the fiber. The scattered wave proceeds around the ring in a direction opposite to the pump wave. On reaching the respective fiber end, the Brillouin scattered wave goes through the same sequence as the pump wave discussed above.

When both pump beams and both scattered beams are included, the result is a pump beam and a Brillouin scattered beam circulating in both a CW and CCW direction around the fiber ring. Components of these beams transmitted by beam splitter 22 in the directions opposite to the original pump beams are incident on beam splitters 20 and 21 which split off a portion of each, beams 45 and 46, and reflect these portions to the recombining beam splitter 26 and thence to the photodiode 50. The heterodyne signal containing the rotational beat frequency is coupled out through coaxial connector 51. The remaining portions of the return beams not split off by beam splitters 20 and 21 reflect off mirrors 18 and 19 and are again incident on modulators 30 and 32. After leaving the modulators the return beams are incident on beam splitter 16 which reflects 50 percent toward the laser 14 and 50 percent into the beam dump 34.

If the energy density of the pump beams is sufficiently high, stimulated Brillouin scattering occurs and the Brillouin scattered beams become coherent, as discussed previously and as explained by Equations 10 and 11. Because fiber ring 12 is optically closed on itself, the precise frequency of each Brillouin ring laser (BRL) is dependent on cavity length, the relationship being as given in Equations 4 and 5, and as explained in the text accompanying those equations. Consequently, if the ring is experiencing rotation about an axis normal to its plane, the precise frequency of each Brillouin ring laser will be shifted from its nonrotating value. One BRL will be shifted in frequency to a higher value that its nonrotating value. The other will be shifted in frequency to a lower value than its nonrotating value. When portions of these beams, as split off by beam splitters 20 and 21, are recollimated by beam splitter 26 and are heterodyned together by photodiode 50, the resultant beat frequency will be as given by Equation 7, the standard ring laser gyroscope equation.

Figure 2:
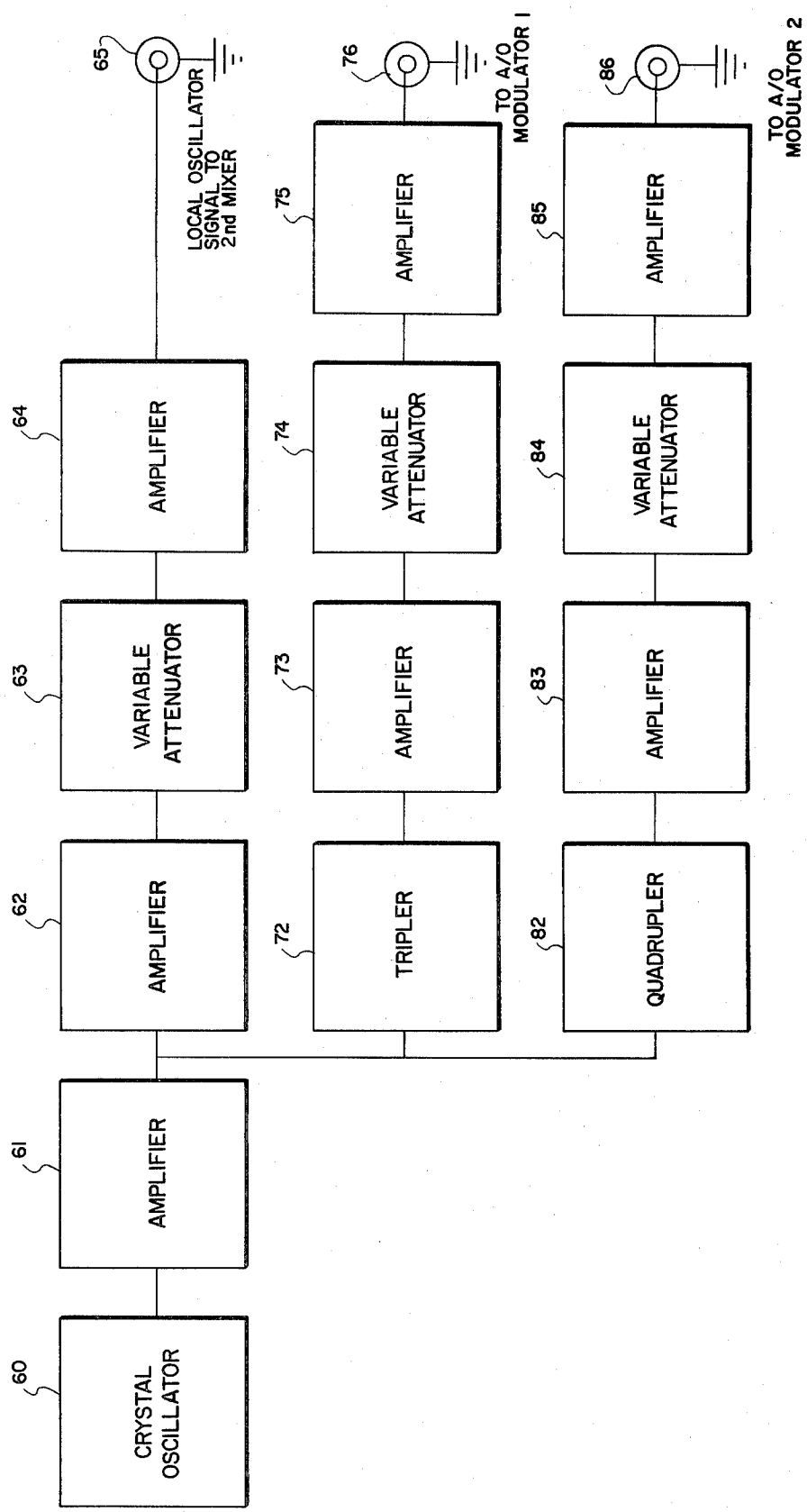
FIG. 2 is a block diagram of the presently preferred embodiment of the modulator.

With reference to FIG. 2, the acousto-optic modulator drive signals and the local oscillator signal are derived as follows: The crystal oscillator 60 generates a 30 MHz signal whose signal frequency is controlled and maintained by a quartz crystal. Amplifier 61 increases the strength of the 30 MHz signal and sends different portions of the amplified signal to amplifier 62, tripler 72, and quadrupler 82. Amplifier 62 amplifies its received 30 MHz signal, feeds the amplified signal to variable attenuator 63 (used to control signal level) from which it proceeds to amplifier 64 and to coaxial connector 65. This 30 MHz signal is used as the local oscillator to drive the second mixer in the beat frequency detection system (see FIG. 3).

The tripler 72 triples the frequency of the 30 MHz input signal from amplifier 61 to 90 MHz and sends this signal to amplifier 73. Amplifier 73 amplifies the magnitude of this 90 MHz signal to a suitable level and feeds it to variable attenuator 74. Attenuator 74 is adjusted to set the correct 90 MHz signal level. The output signal is fed to a power amplifier 75 which feeds coaxial connector 76. The quadrupler 82 and amplifiers 83 and 85 perform exactly the same functions as their counterparts in the tripler channel except that the quadrupler multiples the 30 MHz input signal by a factor of four in frequency to produce a 120 MHz signal. Variable attenuator 84 has a function identical to that of attenuators 63 and 74.

The three output signals from the modulator system are at frequencies of 30 MHz, 90 MHz and 120 MHz. The 30 MHz signal is at a low level (<100 mW) and is used to supply a local oscillator signal via a coaxial cable to the second mixer in the beat frequency detection system (see FIG. 3). The 90 MHz and 120 MHz output signals are at a level of one watt and are used to drive modulators 30 and 32, respectively (see FIG. 1). Connection is by coaxial cable.

Figure 3:
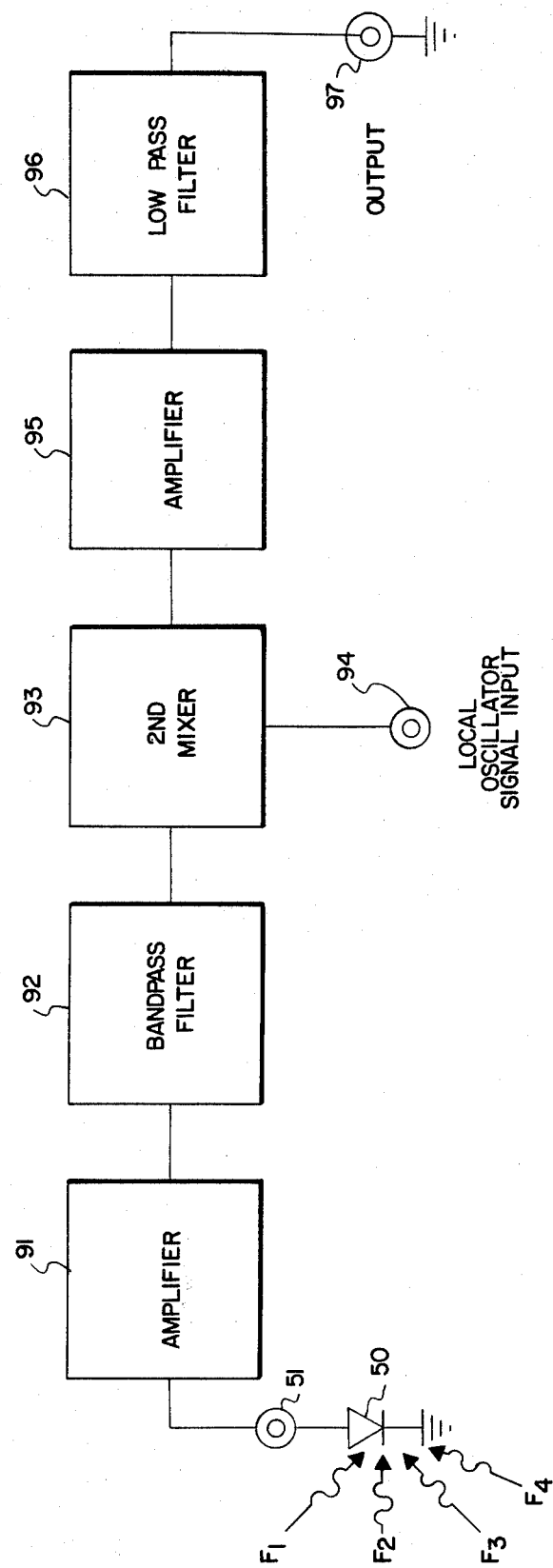
FIG. 3 is a block diagram of the presently preferred embodiment of the beat frequency detection circuit.

The beat frequency detection system is explained with reference to FIG. 3. Photodiode 50 (FIG. 1) is a silicon diode with high frequency response. It produces a photocurrent that is proportional to the optical power incident upon it. The diode is a square law device; that is, its output current is proportional to the square of the incident optical signal amplitude. There are four distinct optical signals incident on the photodiode. With reference to FIG. 1 and its accompanying description, note that the four optical signals incident on photodiode 50 are:

(1) a frequency-shifted pump laser signal at a frequency $f_1 = f_p + 90$ Mhz, where $f_p$ is the frequency of the pump laser output;

(2) a frequency-shifted pump laser signal at a frequency $f_2 = f_p + 120$ MHz;

(3) a Brillouin ring laser beam with a frequency of $f_3 = f_p + 90$ MHz $- 34.1$ GHz $\pm f_R$; and (4) a Brillouin ring laser beam with a frequency of $f_4 = f_p + 120$ MHz $- 34.1$ GHz $\pm f_R$.

Items 1 and 2, above, are portions of the two-frequency-shifted pump beams used to pump the two-way Brillouin ring lasers. Items 3 and 4 are portions of the two Brillouin ring laser beams generated in the optical fiber cavity. Note that 3 and 4 are downshifted in frequency by 34.1 GHz, the sound wave frequency in the fiber waveguide. Note further that each Brillouin ring laser frequency is shifted by a frequency, $f_R$, due to rotation. The plus and minus signs are paired to indicate that if one beam is shifted up in frequency due to rotation, the other will be shifted down in frequency by the same amount, and vice versa.

Mathematically, the signal process can be summarized precisely as follows: The photodiode current is given by $$i_{PD} = k(E_1 \cos 2\pi f_1 t + E_2 \cos 2\pi f_2 t + E_3 \cos 2\pi f_3 t + E_4 \cos 2\pi f_4 t)^2 \quad (12)$$

where $f_1$, $f_2$, $f_3$, and $f_4$ are as noted above, and $E_1$, $E_2$, $E_3$, and $E_4$ are the corresponding amplitudes of the optical signals. Expansion of Equation 12 followed by trigonometric analysis leads to a total phtotodiode output current that contains three sets of components. These include a direct current component, a set of alternating current components containing sum frequencies, and a set of alternating current components containing difference frequencies. The direct current component carries no useful information and is disregarded. The sum frequency components all have frequencies too high for the photodiode response and are not observable. The difference frequency components have frequencies near 34.1 GHz with the exception of one component with a frequency of 30 MHz and one component with a frequency of 30 MHz $+ 2f_R$. The component $2f_R$ carries the desired rotation information and, in fact, $$2f_R = \frac{4A\Omega}{\lambda L}. \quad (13)$$

That is, $2f_R$ is just the beat frequency characterastic of a ring laser gyroscope.

With reference again to FIG. 3, note that the photodiode output is amplified in an amplifier 91 and is then filtered by a bandpass filter 92. The bandpass filter has a pass band extending from 29 to 31 MHz. Any signal having a frequency outside these limits is rejected by the filter. Consequently, all of the difference frequency components with frequencies near 34.1 GHz are rejected. Only the components with frequencies of 30 MHz and 30 MHz $+ 2f_R$ are passed by the filter and fed to the second mixer 93.

The second mixer 93 is fed by the bandpass filter 92 and by the local oscillator signal generated in the modulator section coupled in through coaxial connector 94. The local oscillator signal has a frequency of 30 MHz. The second mixer 93 produces sum and difference frequency outputs. Sum frequency outputs are at 60 MHz and 60 MHz $+ 2f_R$. Difference frequencies are at zero MHz (dc) and $2f_R$. Following amplification in an amplifier 95, the signals are passed through a low pass filter that rejects all components except that with a frequency of $2f_R$. Thus, the output signal at coaxial connector 97 is the beat frequency $$2f_R = \frac{4A\Omega}{\lambda L} \quad (14)$$

the desired ring laser gyroscope beat frequency.

Figure 4:
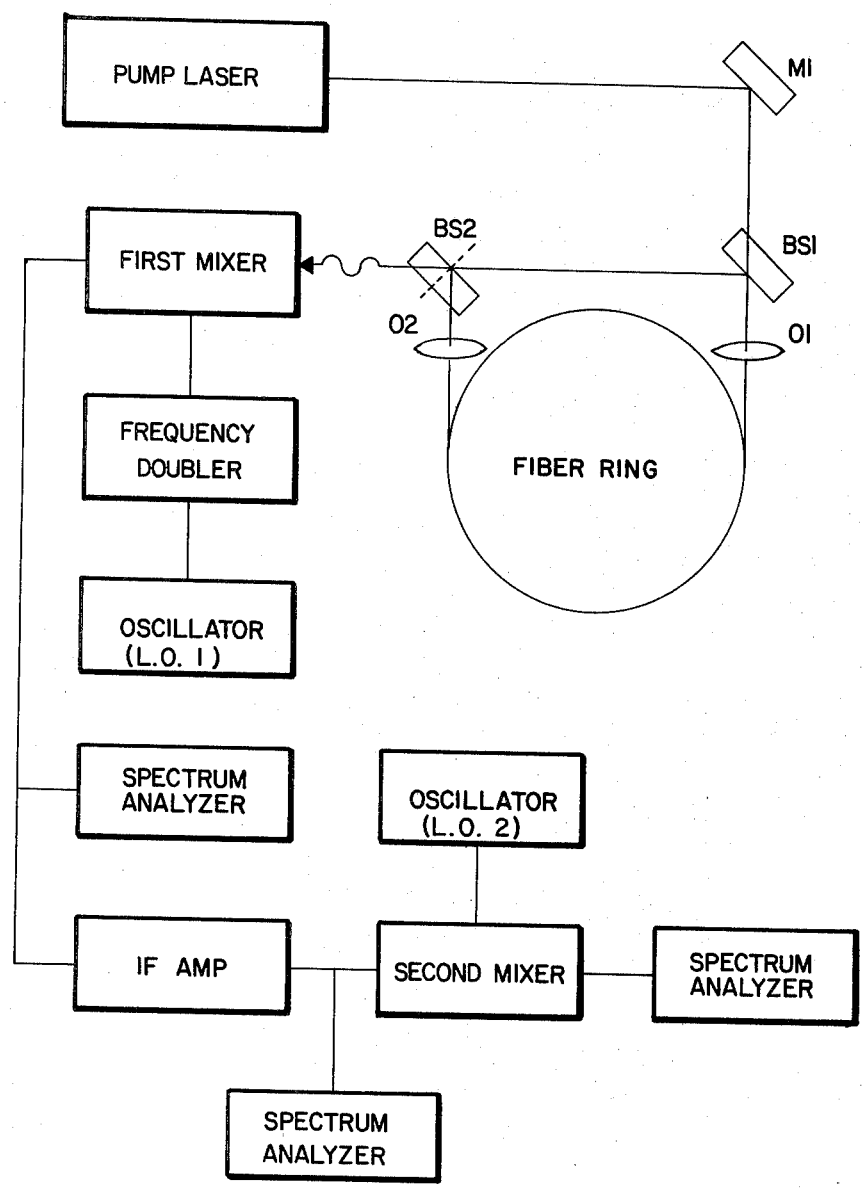
FIG. 4 is a block diagram of the presently preferred embodiment of the heterodyne concept.

Referring now to FIG. 4, an excellent diagnostic system for stimulated Brillouin scattering measurements can be constructed using a heterodyne technique. In this approach, Brillouin scattered light is heterodyned with the pump light that is inducing the stimulated scattering. The result is an RF signal at the difference frequency between pump light and stimulated Brillouin scattered light frequencies. In the fiber optic application, the SBS light is downshifted in frequency from the pump light by an amount equal to the sound wave frequency in the fiber, namely 34 GHz. While this is a high frequency with respect to photodetector technology, there are PIN avalanche photodiodes available with gain bandwidth products of 80 GHz. These diodes have a usable response at 34 GHz and are suitable detectors for the SBS application. The photoelectron emission process is known to take place in less than $10^{-13}$ sec so there is no barrier from basic physics. Signal generators and frequency doublers are available that operate in this region of the spectrum. Therefore, all prerequisites for the experiment are satisfied and the experiment is feasible.

The basic block diagram of the experimental arrangement is shown in FIG. 4. With beam splitter BS2 in the position shown, the experimental arrangement is suitable for studying stimulated Brillouin scattering. With reference to FIG. 4, note that the pump laser output beam is incident on turning mirror M1 and then on beam splitter BS1. The transmitted beam from BS1 is fed to one end of the fiber optic ring by a microscope objective O1. The reflected beam is dumped. Pump light exiting the other fiber end is collimated by objective O2, and is incident on beam splitter BS2. BS2 reflects 50 percent of this light to the photodetector located in the first mixer. The SBS beam proceeds around the fiber ring in the opposite direction to the pump beam. The SBS beam reflects off BS1 and the 50 percent portion transmitted by BS2 is incident on the photodiode together with the portion of the pump beam discussed earlier.

The pump beam has a frequency $f_p = 5.82 \times 10^{14}$ Hz. The Brillouin beam frequency is $f_B = f_p - f_s$ where $f_s$ is the sound wave frequency in the fiber; ~34 GHz. The photodetector is a square law device, i.e., its output current is proportional to the square of the total incident electric field. Consequently, sum and difference frequencies theoretically are present in the output current (e.g., $f_p + (f_p - f_s)$, $f_p - (f_p - f_s)$, etc.). In fact, the diode cannot respond at optical frequencies so only the frequency $f_s$ is present in the diode output current. More precisely, the output current contains three components. There are: a dc component proportional to the average total light intensity, an ac component at the frequency $f_s$, and a shot noise component whose magnitude is dependent on the average (dc) current and the electronic bandwidth into which the diode works. The component of major interest here is the ac component at frequency $f_s$.

The first mixer consists of a microwave cavity resonant at 34 GHz with the aforementioned photodiode coupled into one end. A crystal detector is coupled into the other end. The cavity is also fed by a local oscillator, LO1. LO1 operates in the frequency range from 15 to 21 GHz and the frequency doubler output is in the frequency range from 30 to 42 GHz. LO1 will be set to a frequency of 17.015 GHz and the doubled frequency signal at 34.03 GHz is fed to the cavity as a local oscillator signal. This signal and the 34 GHz signal from the photodetector are mixed together in the crystal detector coupled into the other end of the cavity. The output from this crystal mixer is an intermediate frequency signal at a frequency of 30 MHz, an easily handled region of the RF spectrum. The desired signal, $f_s$, is present on this intermediate frequency component.

The IF output signal from the first mixer can now be examined with a spectrum analyzer. If the signal amplitude is too low, the spectrum analyzer can be connected after the IF amplifier. The pump beam is provided by a LEXEL Model 96 argon-ion laser. This laser has an intercavity Fabry-Perot interferometer to select and control the laser frequency. The linewidth of 514.5 nm, the preferred pump wavelength, is 3 MHz. Observations of the Brillouin line with a Fabry-Perot interferometer show that the Brillouin line bandwidth is also 3 MHz, or less. The 30 MHz IF amplifier bandwidth will be adequate to show the precise Brillouin linewidth, shape, and structure. A parametric study will be performed to determine effects of fiber temperature, length and so forth on the Brillouin scattering.

The experimental arrangement is sufficiently versatile that most experimental exigencies can be handled. For example, if the 30 MHz IF amplifier does not have sufficient bandwidth, a 60 MHz or higher frequency IF can be selected.

The experimental arrangement shown in FIG. 4 can be converted into a Brillouin ring laser and rotation sensor. If the beam splitter BS2 is rotated into the dashed position, feedback around the ring is obtained. This arrangement produces a clean Brillouin backward wave oscillator. Isolation between the Brillouin oscillator and the pump laser is high. Consequently, pulling effects and induced instabilities in the pump laser output are eliminated. In order to heterodyne the pump with the Brillouin laser wave, an additional mirror must be added to reflect the pump beam transmitted by BS2 into the photodiode since the reflected portion is now directed toward BS1.

In the Brillouin ring laser (BRL) configuration, the precise BRL frequency will be determined by laser resonator constraints. That is, the precise wavelength (and frequency) will be determined by the requirement that $$m\lambda_B = L \quad (15)$$

where m is the longitudinal mode number and L is the cavity length (not $m\lambda/2 = L$ as in a linear resonator). In the fiber, $\lambda_B = v/f_B$ with $v = c/n$, leading the relationship $$F_B = mc/nL \quad (16)$$

where n is the index of refraction and c is the speed of light. The longitudinal mode spacing is $$\Delta F_B = c/nL \quad (17)$$

The BRL linewidth and mode spacing can be studied precisely with the heterodyne system.

As with the ordinary ring laser, the system shown in FIG. 4 can be used as a rotation sensor. The frequency shift from the zero rotational rate will be given by $$\Delta f = \frac{2A\Omega}{\lambda L} \quad (18)$$

In Equation 18, A is the area enclosed by the fiber ring, $\Omega$ is the angular rotation rate in the plane of the ring, and the other terms are as previously defined. For rotation rate sensing, the remainder of the block diagram shown in FIG. 4 must be considered. The output of the IF amplifier is fed to a second mixer which mixes the nominal 30 MHz IF output of the first mixer/IF amplifier with a 30 MHz LO2 signal. The output is the frequency $\Delta f$, given in Equation 18. Careful attention must be given to the frequency stability of both local oscillators. In particular, for rotation rate sensing a means must be devised for controlling LO1 frequency by tying it to the SBS/pump frequency difference that exists in the absence of any rotation. This is also feasible.

In summary, the heterodyne system proposed here will constitute a rotation sensor that is free of the lockup problems associated with two-way ring laser gyroscopes. Sensitivity will be one-half of that for a conventional two-way ring laser gyroscopes of the same size.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A two-frequency ring laser gyroscope comprising:
a pump laser;
means for dividing the pump laser beam into two equal intensity beams;

means for modulating the two derived beams to shift their frequencies to a different frequency from the pump beam and from each other;

means for coupling the two-frequency-shifted beams into opposite ends of an optical fiber waveguide ring;

an optical fiber waveguide ring to be used as a laser cavity;

means for pumping the optical fiber waveguide cavity by the two derived beams in both the clockwise and counterclockwise directions simultaneously in order to excite stimulated Brillouin scattering in both directions around the ring;

means for optically closing the ring on itself so that the stimulated Brillouin scattering results in two oppositely circulating Brillouin ring lasers;

means for extracting a portion of each Brillouin ring laser beam and bringing the two extracted beams to a common point;

means for mixing the two extracted beams together in a photodiode to produce a beat frequency proportional to the ring rotation rate about an axis perpendicular to the plane of the ring;

means for measuring the magnitude of the beat frequency so derived;

means for generating the electrical signals required to drive the laser beam modulators; and means for signal processing required to detect, amplify and filter the beat frequency signal.

* * * * *

UNITED STATES PATENT AND TRADEMARK OFFICE
CERTIFICATE OF CORRECTION

PATENT NO. : 4,396,290
DATED : August 2, 1983
INVENTOR(S) : Glen J. Morris

It is certified that error appears in the above—identified patent and that said Letters Patent is hereby corrected as shown below:

Column 1, line 57, "are" should be --area--
Column 2, line 23, "seed" should be --speed--
Column 7, line 44, "propogating" should be --propagating--
Column 8, line 26, "beats" should be --beams--
Column 10, line 35, "that" should be --than--
Column 11, line 25, "Mhz: should be --MHz--
Column 11, line 50, rewrite equation 12 as follows:

$$IPD = K[(E_1 \cos 2\pi f_1 t + E_2 \cos 2\pi f_2 t) + (E_3 \cos 2\pi f_3 t + E_4 \cos 2\pi f_4 t)]^2 \quad (12)$$

Column 13, line 17, "There" should be --These--
Column 14, lines 18 and 23 (equations 16 and 17) "F" should be --f--

Signed and Sealed this

Seventh Day of February 1984

[SEAL]

Attest:

GERALD J. MOSSINGHOFF

Attesting Officer

Commissioner of Patents and Trademarks